(12) United States Patent
Gennari et al.

(10) Patent No.: US 8,631,373 B1
(45) Date of Patent: Jan. 14, 2014

(54) YIELD ANALYSIS WITH SITUATIONS

(75) Inventors: Frank E. Gennari, Berkeley, CA (US);
Ya-Chieh Lai, Antioch, CA (US);
Matthew W. Moskewicz, Berkeley, CA
(US); Michael C. Lam, Rancho
Cucamonga, CA (US); **Gregory R.
McIntyre**, El Cerrito, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 500 days.

(21) Appl. No.: 12/645,173

(22) Filed: Dec. 22, 2009

Related U.S. Application Data

(60) Division of application No. 11/609,903, filed on Dec. 12, 2006, now Pat. No. 7,661,087, which is a continuation of application No. 11/207,267, filed on Aug. 18, 2005, now Pat. No. 7,418,693.

(60) Provisional application No. 60/602,901, filed on Aug. 18, 2004, provisional application No. 60/602,800, filed on Aug. 18, 2004, provisional application No. 60/602,899, filed on Aug. 18, 2004.

(51) Int. Cl.
*G06F 17/50* (2006.01)

(52) U.S. Cl.
USPC ............ 716/118; 716/119; 716/122; 716/124

(58) Field of Classification Search
USPC .................................. 716/118, 119, 122, 124
See application file for complete search history.

(56) References Cited

U.S. PATENT DOCUMENTS 5,801,954 A * 9/1998 Le et al. ..................... 716/52
6,044,007 A 3/2000 Capodieci
6,057,249 A 5/2000 Chen
(Continued)

OTHER PUBLICATIONS

Notice of Allowance mailed Apr. 9, 2009 for U.S. Appl. No. 11/207,266.
(Continued)

*Primary Examiner* — Stacy Whitmore
*Assistant Examiner* — Magid Dimyan
(74) *Attorney, Agent, or Firm* — Vista IP Law Group, LLP

(57) ABSTRACT

Systems, methodologies and technologies for the analysis and transformation of integrated circuit layouts using situations are disclosed. A method for transforming an integrated circuit (IC) layout includes recognizing shapes within the IC layout, identifying features for each of the shapes and extracting situations for the respective features. Extracted situations can be used to improve optical proximity correction (OPC) of the IC layout. This improved OPC includes extracting the situations, simulating the situations to determine a set of the situations identified for modification based on failing to satisfy a desired OPC tolerance level, modifying the set of situations to improve satisfaction of the desired OPC tolerance level, and reintegrating the modified set of situations into the IC layout. Extracted situations can also be used to improve aerial image simulation of the IC layout. This improved aerial image simulation includes extracting the situations, simulating a subset of the situations to determine aerial images of the subset, and tiling the subset of situations to form a larger aerial image. Extracted situations can further be used to improve density analysis of the IC layout. This improved density analysis includes extracting the situations for a window of the IC layout, removing overlap from the window based on the extracted situations, calculating a density for each of the situations, and calculating a density for the window based on the density for each of the situations.

19 Claims, 14 Drawing Sheets

(56) References Cited

U.S. PATENT DOCUMENTS

| | | | |
|---|---|---|---|
| 6,131,182 A * | 10/2000 | Beakes et al. | 716/105 |
| 6,171,731 B1 | 1/2001 | Medvedeva et al. | |
| 6,393,602 B1 | 5/2002 | Atchison et al. | |
| 6,397,373 B1 | 5/2002 | Tseng et al. | |
| 6,425,112 B1 | 7/2002 | Bula et al. | |
| 6,453,457 B1 | 9/2002 | Pierrat et al. | |
| 6,492,066 B1 | 12/2002 | Capodieci et al. | |
| 6,523,162 B1 | 2/2003 | Agrawal et al. | |
| 6,611,946 B1 | 8/2003 | Richardson et al. | |
| 6,804,394 B1 | 10/2004 | Hsu | |
| 6,902,855 B2 | 6/2005 | Peterson et al. | |
| 7,003,758 B2 | 2/2006 | Ye et al. | |
| 7,155,698 B1 | 12/2006 | Gennari | |
| 7,175,940 B2 | 2/2007 | Laidig et al. | |
| 7,243,316 B2 | 7/2007 | White et al. | |
| 7,318,214 B1 | 1/2008 | Prasad et al. | |
| 7,386,433 B2 | 6/2008 | MacLean et al. | |
| 7,412,676 B2 * | 8/2008 | Cobb et al. | 716/106 |
| 7,418,693 B1 * | 8/2008 | Gennari et al. | 716/55 |
| 7,707,542 B1 * | 4/2010 | Gennari et al. | 716/50 |
| 7,752,584 B2 | 7/2010 | Yang | |
| 7,818,707 B1 * | 10/2010 | Gennari et al. | 716/53 |
| 8,079,005 B2 | 12/2011 | Lai | |
| 2002/0083401 A1 | 6/2002 | Breiner et al. | |
| 2003/0061592 A1 | 3/2003 | Agrawal et al. | |
| 2003/0103189 A1 | 6/2003 | Neureuther et al. | |
| 2003/0118917 A1 | 6/2003 | Zhang et al. | |
| 2003/0192013 A1 * | 10/2003 | Cote et al. | 716/2 |
| 2003/0229879 A1 * | 12/2003 | Pierrat | 716/19 |
| 2004/0076323 A1 | 4/2004 | Fujii et al. | |
| 2004/0123265 A1 | 6/2004 | Andreev et al. | |
| 2004/0202355 A1 | 10/2004 | Hillhouse | |
| 2004/0216065 A1 * | 10/2004 | Cobb et al. | 716/8 |
| 2005/0015740 A1 | 1/2005 | Sawicki et al. | |
| 2005/0044514 A1 | 2/2005 | Wu et al. | |
| 2005/0076322 A1 | 4/2005 | Ye et al. | |
| 2005/0100802 A1 | 5/2005 | Callan et al. | |
| 2005/0114822 A1 | 5/2005 | Axelrad et al. | |
| 2005/0130047 A1 | 6/2005 | Kroyan | |
| 2005/0198602 A1 | 9/2005 | Brankner | |
| 2006/0075379 A1 | 4/2006 | Kamat | |
| 2006/0206851 A1 | 9/2006 | Van Wingerden et al. | |
| 2007/0077504 A1 | 4/2007 | Park | |

OTHER PUBLICATIONS

Notice of Allowance mailed Dec. 22, 2008 for U.S. Appl. No. 11/207,266.
Non-Final OA mailed Apr. 25, 2008 for U.S. Appl. No. 11/207,266.
Non-Final OA mailed Nov. 30, 2007 for U.S. Appl. No. 11/207,266.
Notice of Allowance mailed Sep. 10, 2009 for U.S. Appl. No. 11/207,266.
Non-Final OA mailed Feb. 18, 2009 for U.S. Appl. No. 11/609,892.
Final Office Action mailed on Sep. 30, 2009 for U.S. Appl. No. 11/609,892.
Notice of Allowance dated Mar. 1, 2010 for U.S. Appl. No. 11/609,892.
Notice of Allowance dated Jun. 11, 2010 for U.S. Appl. No. 11/609,892.
Notice of Allowance dated Apr. 21, 2008 for U.S. Appl. No. 11/207,267.
Non-Final OA dated Nov. 30, 2007 for U.S. Appl. No. 11/207,267.
Final OA mailed Jul. 17, 2009 for U.S. Appl. No. 11/609,895.
Non-Final OA mailed Mar. 16, 2009 for U.S. Appl. No. 11/609,895.
Non-Final OA mailed Sep. 18, 2008 for U.S. Appl. No. 11/609,895.
Notice of Allowance mailed Nov. 18, 2009 for U.S. Appl. No. 11/609,895.
Non-Final Office Action dated Feb. 19, 2010 for U.S. Appl. No. 11/609,901.
Notice of Allowance dated Jun. 10, 2010 for U.S. Appl. No. 11/609,901.
Notice of Allowance mailed May 29, 2009 for U.S. Appl. No. 11/609,903.
Notice of Allowance mailed Sep. 10, 2009 for U.S. Appl. No. 11/609,903.
Non-Final OA mailed Nov. 5, 2008 for U.S. Appl. No. 11/609,903.
Final OA mailed Apr. 13, 2009 for U.S. Appl. No. 11/609,904.
Non-Final OA mailed Jul. 23, 2009 for U.S. Appl. No. 11/609,904.
Notice of Allowance dated Feb. 15, 2012 for U.S. Appl. No. 12/644,789.
Notice of Allowance mailed on Dec. 10, 2009 for U.S. Appl. No. 11/609,904.
Non-Final OA mailed Sep. 15, 2008 for U.S. Appl. No. 11/609,904.
Non-Final Office Action dated Mar. 24, 2011 for U.S. Appl. No. 12/644,742.
Notice of Allowance dated Aug. 18, 2011 for U.S. Appl. No. 12/644,742.
Non-Final Office Action dated Oct. 6, 2011 for U.S. Appl. No. 12/644,789.
Notice of Allowance dated Sep. 17, 2012 for U.S. Appl. No. 12/644,647.
Non-Final Office Action dated May 17, 2012 for U.S. Appl. No. 12/644,647.
Final Office Action dated Oct. 10, 2013 for U.S. Appl. No. 12/907,003.

\* cited by examiner

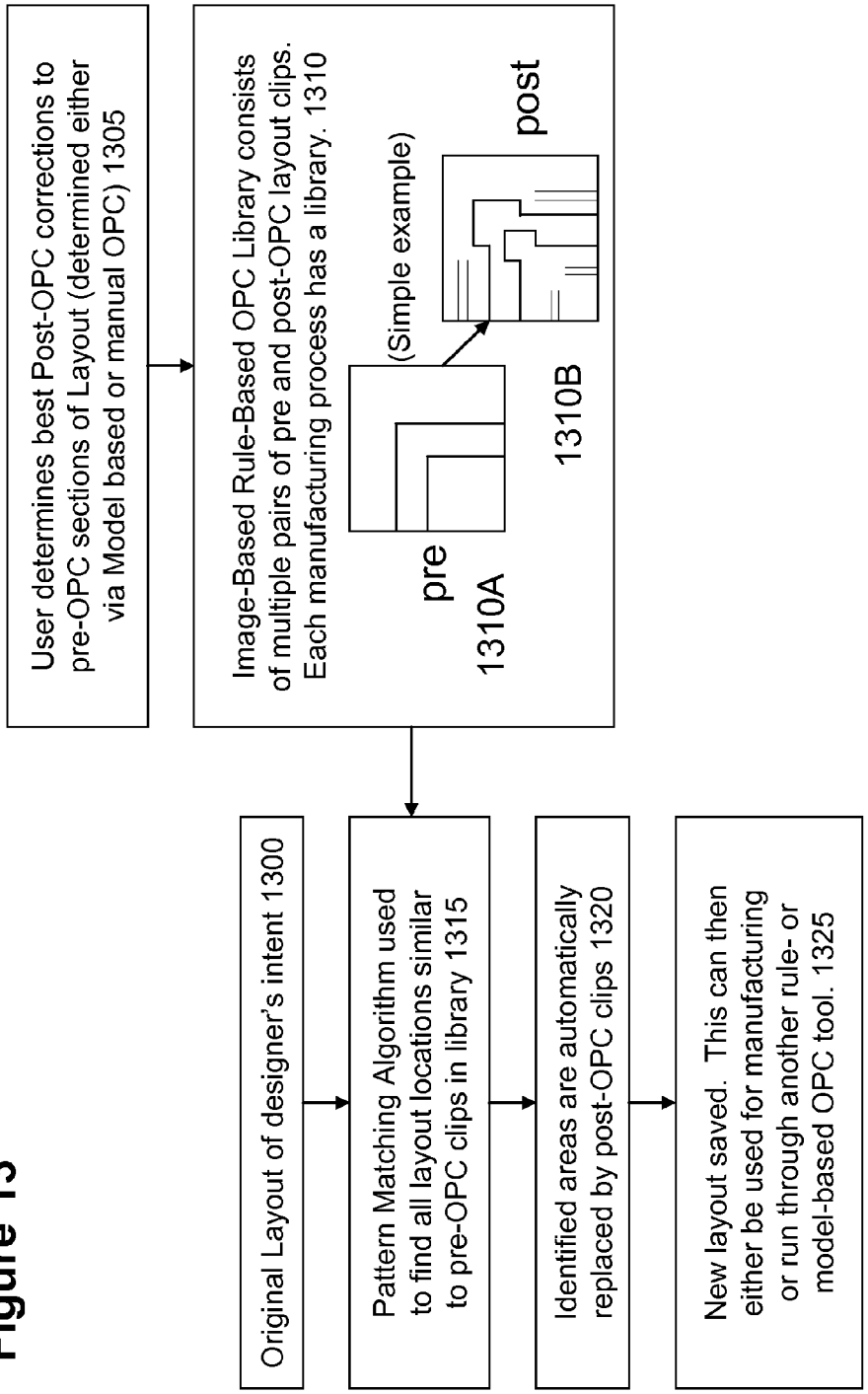

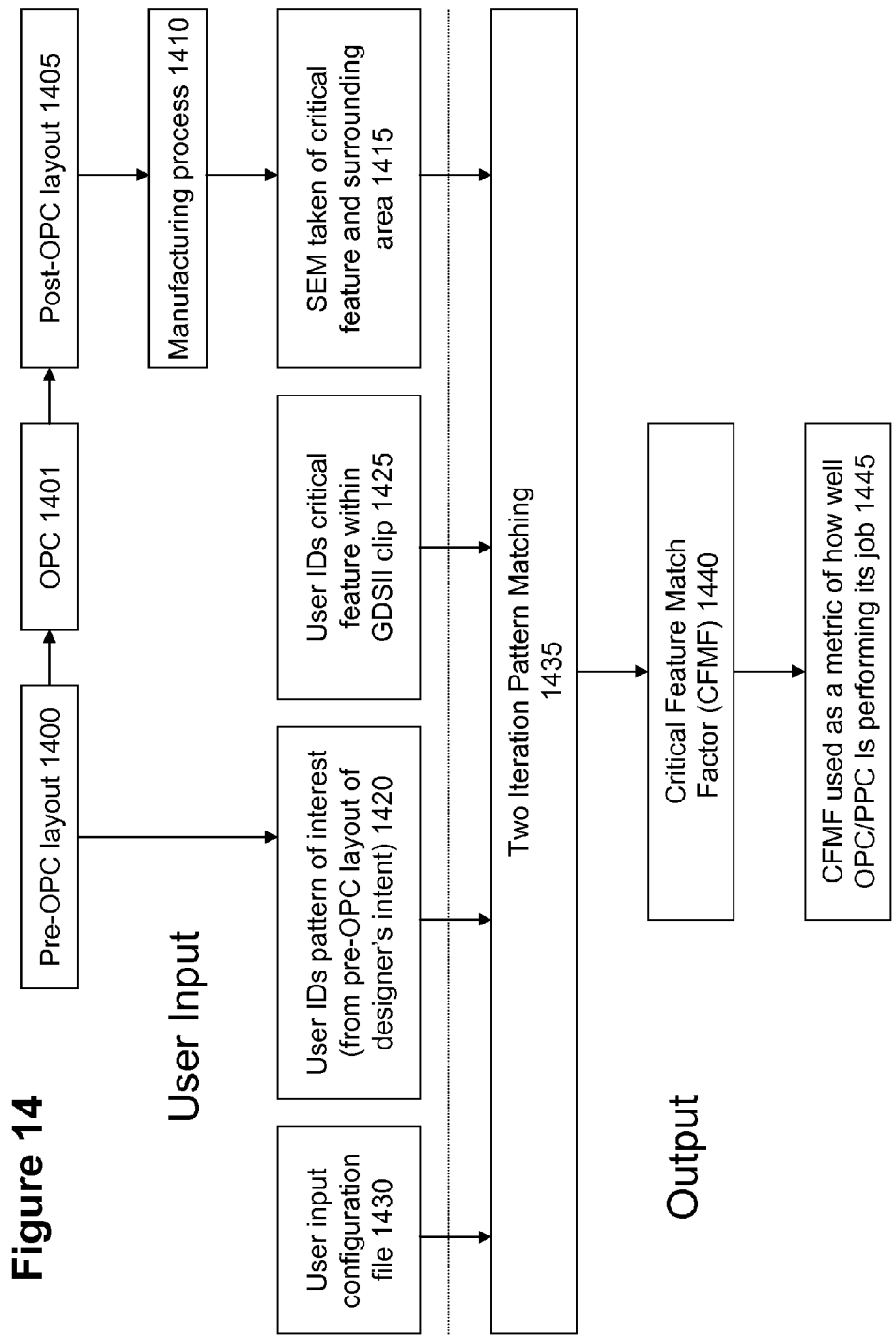

YIELD ANALYSIS WITH SITUATIONS

This application is a Divisional of U.S. Non-Provisional application Ser. No. 11/609,903, now U.S. Pat. No. 7,661,087, filed Dec. 12, 2006, which is a continuation application of U.S. patent application Ser. No. 11/207,267, now U.S. Pat. No. 7,418,693, entitled "System and Method for Analysis and Transformation of Layouts Using Situations," filed on Aug. 18, 2005, which claims the benefit of priority from U.S. Provisional Patent Application No. 60/602,901, filed Aug. 18, 2004, entitled "System and Method for Augmenting Optical Proximity Correction (OPC) Using Pattern matching," and U.S. Provisional Patent Application No. 60/602,800, filed Aug. 18, 2004, entitled "System and Method for Implementing Image-Based Design Rules Using Pattern-Matching for Effective Design for Manufacturability of Semiconductors," and U.S. Provisional Patent Application No. 60/602,899, filed Aug. 18, 2004, entitled "System and Method for Determining Across Chip Critical Feature Variation Using Pattern Matching." All of the above-identified applications are incorporated herein by reference in their entirety.

CROSS-REFERENCE TO RELATED APPLICATIONS

This application is related to U.S. patent application Ser. No. 11/207,266, entitled "System and Method for Implementing Image-based Design Rules," filed on Aug. 18, 2005, which is fully incorporated herein by reference for all purposes.

BACKGROUND OF THE INVENTION

1. Field of the Invention

The present invention relates generally to systems, methodologies and techniques for improving design for manufacturability of integrated circuits and semiconductors, and more particularly relates to systems, methodologies and technologies for the analysis and transformation of integrated circuit layouts using situations.

2. Description of the Related Art

Traditionally, semiconductor design for even modestly complex semiconductors has involved the use of a series of masks, layered one on top of the other, to represent the completed design, where each mask represents a processing step. The impact of even small errors in the design of a single mask can propagate to the complete failure of an entire design. It has therefore become important that the design of individual masks be optimized against such errors even before fabrication of the semiconductor begins.

To avoid such costly errors, a typical semiconductor manufacturer implements fairly complex set of layout analyses and transformations (or modifications) to improve the yield of their designs and minimize the design errors of individual masks. Today's integrated circuits can typically contain eight or more metal layers and two poly layers, which translates into several dozen mask layers. A modern design with 50 million transistors can contain more than a billion shapes. GDSII layout files can reach sizes in excess of 100 Gigabytes (GB) after traditional optical proximity correction features are added and the geometry is flattened. The computational load of performing analyses and transformations on modern IC layouts keeps growing.

Additionally, as diffraction-limited optical systems have become implemented in semiconductor manufacturing, what is printed on the wafer may not be what was designed on the mask. One such error is typically referred to as an optical proximity effect. One technique that has been developed for identifying optical proximity effects that will require a transformation of the layout is optical proximity correction, or OPC. OPC is typically either rule-based or model-based. Rule-based OPC involves automatically altering a feature depending on a list of predetermined rules, and generally uses a geometric algorithm to find a particular feature type. This feature is then automatically changed, based on the rule. Model-based OPC uses a fast simulation technique to predict how a mask feature will appear on the wafer (i.e., based on the simulated, optical characterizations of the manufacturing equipment). Iterative modifications are made until an acceptable error exists between the designer's intent and the simulated wafer feature.

The OPC problem is significant for its complexity. Most algorithms become easier to perform each year as CPU speed is constantly increasing. However, OPC involves using today's processors to design tomorrow's processors, which means that the problem complexity scales with the speed to today's processors. In fact, the OPC complexity may scale more quickly than the current CPU speeds are increasing because of additional factors such as an increasing number of mask (i.e., metal) layers. Since the OPC problem involves storing a dynamic polygon database, tens or hundreds of GBs of memory are likely needed for good performance. These figures roughly double with each technology generation.

Thus, what is needed are systems and techniques that allow broader, yet efficient, means to perform computationally intensive transformations and analyses, such as OPC, on IC layouts as semiconductor feature size decreases and mask designs become more numerous and complex.

SUMMARY OF THE INVENTION

Systems, methodologies and technologies for the analysis and transformation of integrated circuit layouts using situations are disclosed. A method for transforming an integrated circuit (IC) layout includes recognizing shapes within the IC layout, identifying features for each of the shapes and extracting situations for the respective features. The extracted situations can also be merged. Once extracted, the situations can be stored in a situation database.

Extracted situations can be used to improve optical proximity correction (OPC) of the IC layout. This improved OPC includes extracting the situations, simulating the situations to determine a set of the situations identified for modification based on failing to satisfy a desired OPC tolerance level, modifying the set of situations to improve satisfaction of the desired OPC tolerance level, and reintegrating the modified set of situations into the IC layout. The reintegrated set of modified situations can be stitched to resolve IC layout conflicts.

Extracted situations can also be used to improve aerial image simulation of the IC layout. This improved aerial image simulation includes extracting the situations, simulating a subset of the situations to determine aerial images of the subset, and tiling the subset of situations to form a larger aerial image. The tiled subset of situations can be stitched to resolve simulation conflicts.

Extracted situations can further be used to improve density analysis of the IC layout. This improved density analysis includes extracting the situations for a window of the IC layout, removing overlap from the window based on the extracted situations, calculating a density for each of the situations, and calculating a density for the window based on the density for each of the situations. The steps of the improved density analysis can be performed iteratively. The density calculations can be stored.

FIGURES

These and other aspects and features of the present invention will become apparent to those ordinarily skilled in the art upon review of the following description of specific embodiments of the invention in conjunction with the accompanying figures, wherein.

Figure 9:
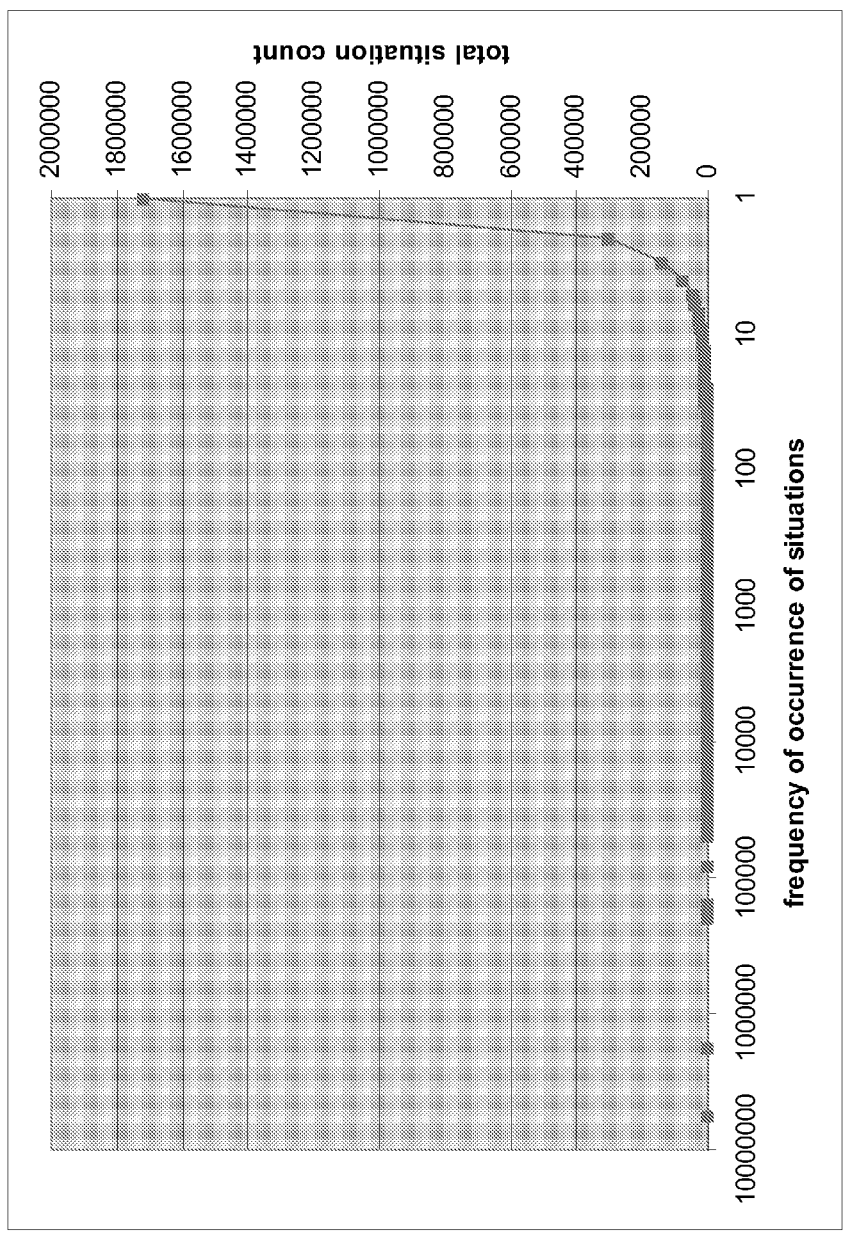
Figure 10:
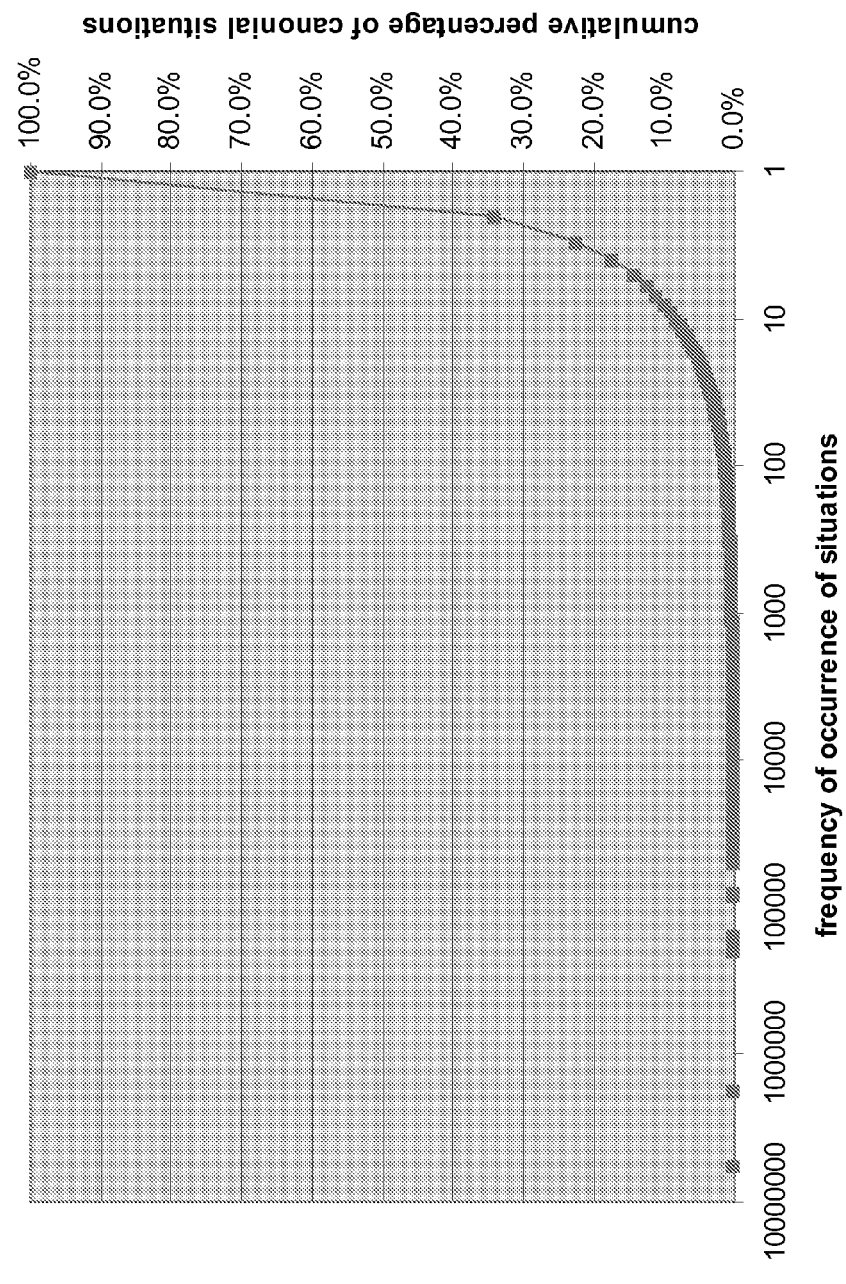
Figure 11:
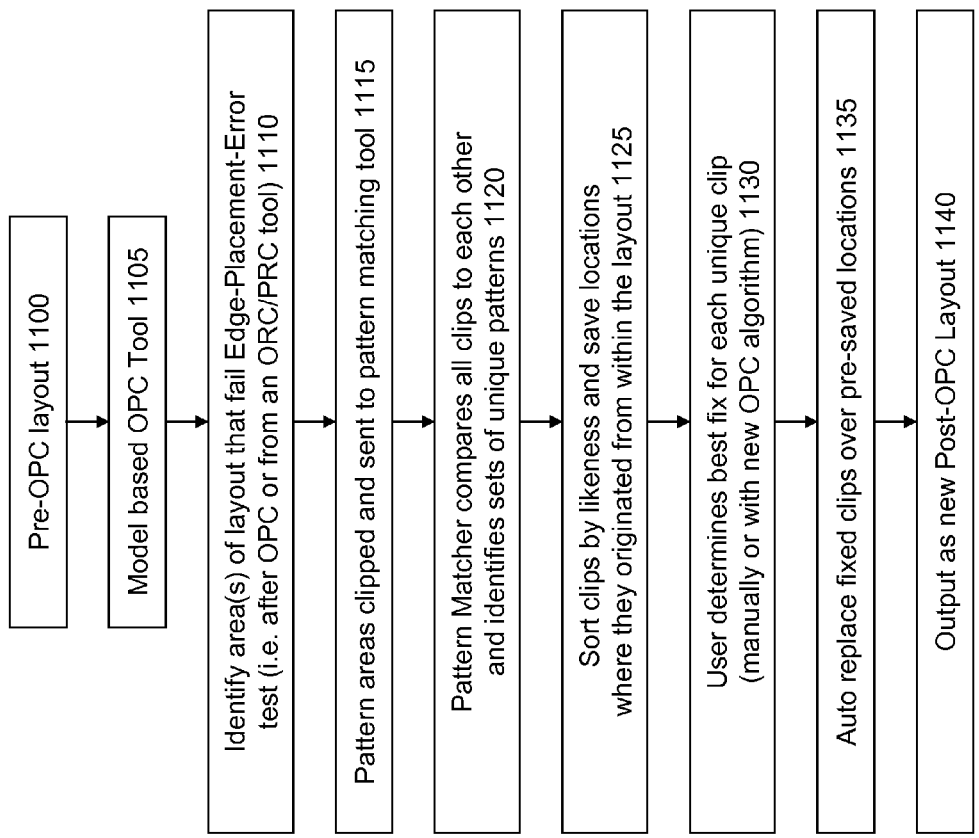
Figure 12:
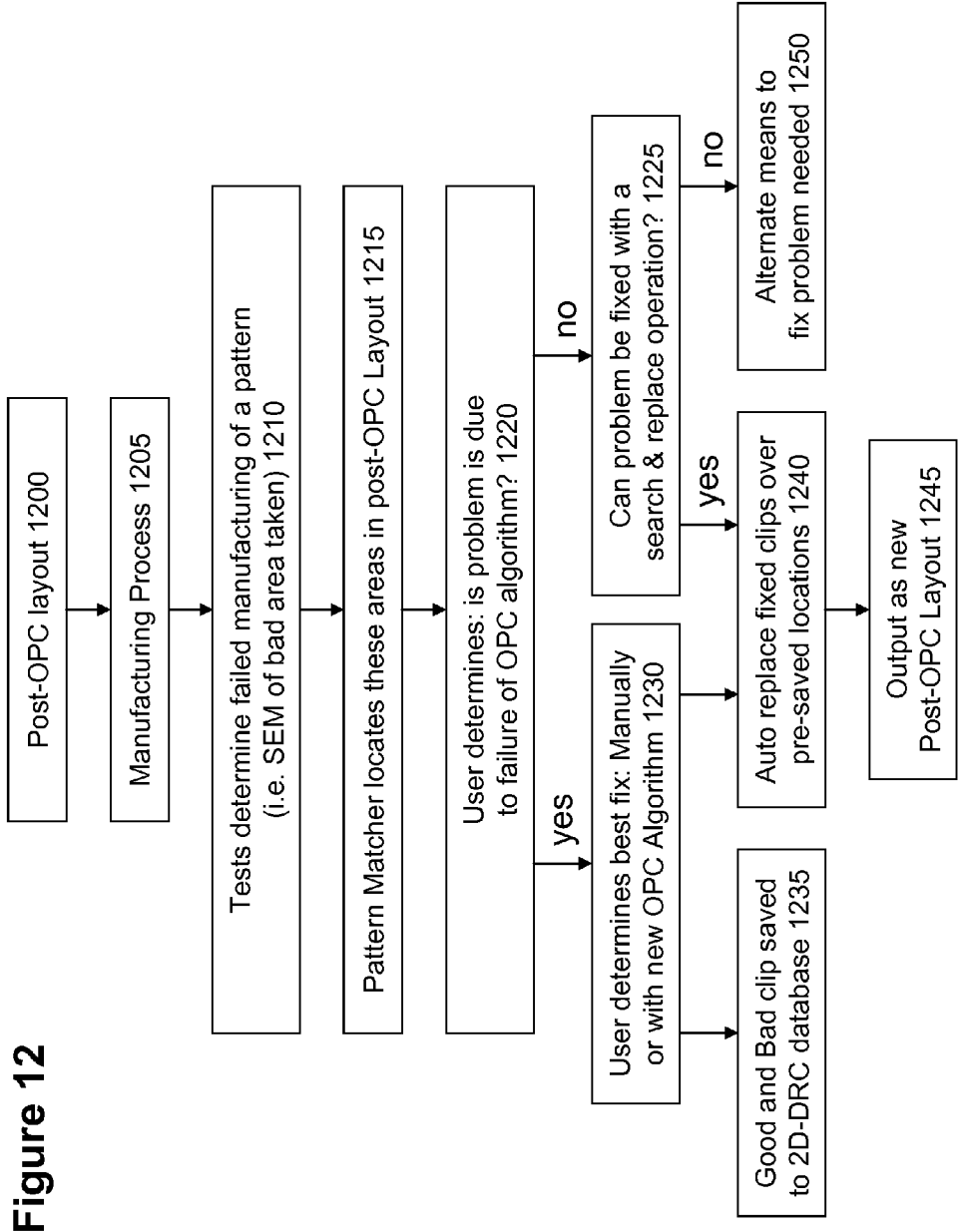

FIG. 9 provides an exemplary histogram plot for measuring layout entropy according to certain embodiments of the invention;

FIG. 10 illustrates layout entropy where the total situation count can be displayed as a cumulative percentage of canonical situations relative to the total number of situations according to certain embodiments of the invention;

FIG. 11 illustrates a flow diagram for efficiently resolving pattern errors through the use of pattern matching according to certain embodiments of the present invention;

FIG. 12 illustrates a flow diagram for quickly applying pattern corrections to a layout according to certain embodiments of the present invention;

FIG. 13 illustrates a flow diagram for implementing image-based pattern matching according to certain embodiments of the present invention; and FIG. 14 illustrates a flow diagram for determining a figure of merit referred to as a match factor for evaluating how well a particular layout matches a designer's intent according to certain embodiments of the present invention.

DETAILED DESCRIPTION OF THE INVENTION

The present invention will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods), only those portions of such known components (or methods) that are necessary for an understanding of the present invention will be described, and the detailed descriptions of other portions of such known components (or methods) will be omitted so as not to obscure the invention. Further, the present invention encompasses present and future known equivalents to the components referred to herein by way of illustration.

Situations Defined

A layout is a collection of shapes. A situation is a configuration of shapes or cell instances. A layout can be comprised entirely of overlapping situations where any given situation may exist in one or more locations on the layout. The complete set of situations, along with the list of coordinates in which the situations appear in the layout can be an alternative representation of the entire layout. The canonical set of situations is a subset of the complete set of situations and can be an alternative representation of the possible layout configurations in the layout within a certain radius of extraction. Situations can be extracted based upon a radius of extraction, r, that can be Manhattan (i.e., the orthogonal distance between two points), Euclidian, or other. Based upon the application, the radius of extraction of the situations can vary. For instance, for designs or layouts where optical effects are important, the radius is typically selected based upon the radius of optical influence. Of course many other methods for defining the radius exist.

Figure 1:
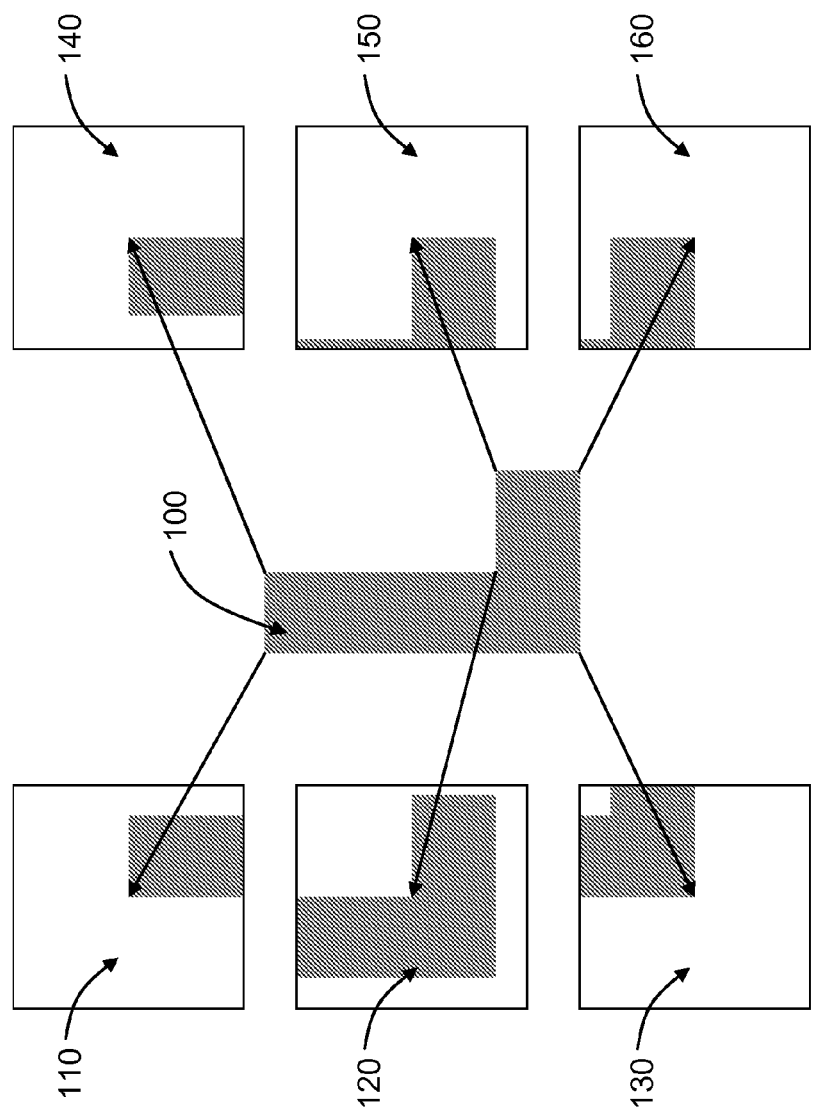
FIG. 1 illustrates an example of performing a situation extraction based on corners according to certain embodiments of the present invention.

FIG. 1 illustrates an example of performing a situation extraction based on corners according to certain embodiments of the present invention. Referring to FIG. 1, polygon 100 can include a small example layout. In one embodiment of situations, situations can be based on corners. Situation 110 through 160 are the six situations that can be derived from polygon 100 based on corners. This example uses a Manhattan radius of extraction r, which can, for example, result in square situations of size 2r by 2r. Situation 110 and 140 are mirror images of one another. For some layouts, users may wish to merge situations 110 and 140; consistent with embodiments of the invention, geometric transformation such as translations, mirroring, or rotations are common candidates for situation merging.

Figure 2:
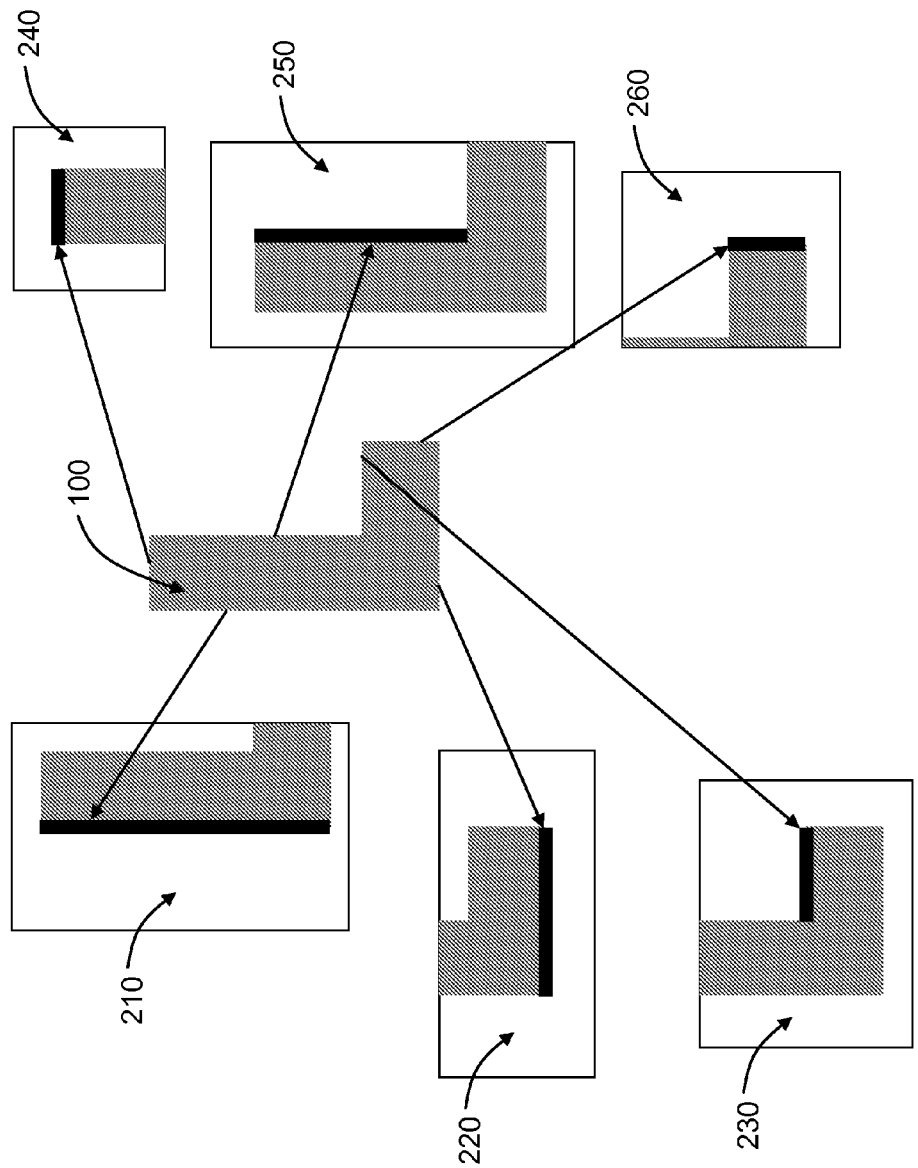
FIG. 2 illustrates an example of performing a situation extraction based on edges according to certain embodiments of the present invention.

FIG. 2 illustrates an example of performing a situation extraction based on edges according to certain embodiments of the present invention. Referring to FIG. 2, polygon 100 is again shown as an example of a small layout. In another embodiment of situations, situations can be based on edges. Situation 210 through 260 are the six situations that can be derived from polygon 100 based on edges. In these figures, the dark lines in the middle of situations 210 through 260 represent the edges around which the situations have been extracted. The size of a situation can be dependent on the length of the corresponding edge around which that situation has been extracted. This example uses a Manhattan radius of extraction r, resulting in situations that are of size 2r by 2r+z, where z is the length of the edge around which the situation has been extracted. As with situations based on corners, users may wish to merge situations based on geometric transformation such as translations, mirroring, or rotations.

So far in this description of situations, a situation has been extracted from the point of view of layout configurations. A situation in this context can be a collection of shapes within a given radius around an edge or corner. This approach traverses the hierarchy of cells and extracts the collections of shapes and other cell instances around every cell instance flattened to some level of hierarchy. The traversal may be limited to a certain level of hierarchy or may proceed to the shapes at the leaves of the hierarchy tree. This approach is referred to in this document as extracting situations based on the hierarchy (or alternatively extraction "based on cells").

Figure 3:
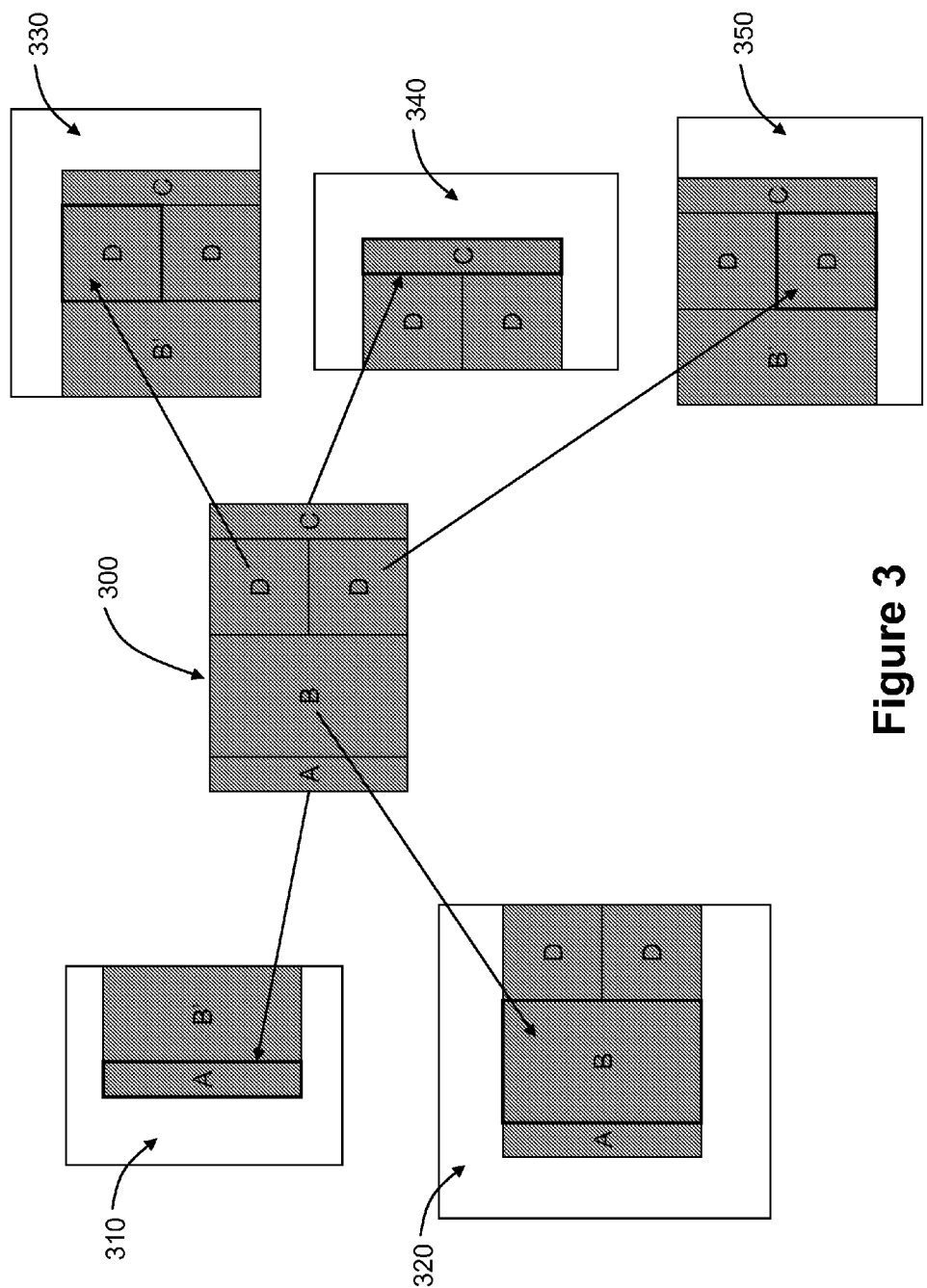
FIG. 3 illustrates an example of performing a situation extraction based on the hierarchy according to certain embodiments of the present invention.

FIG. 3 illustrates an example of performing a situation extraction based on the hierarchy according to certain embodiments of the present invention. Referring to FIG. 3, an example top level cell 300 with leaf-cells A, B, C and two instantiations of D is shown. Situation 310 through 350 are five situations that can be derived from cell 300 based on the hierarchy. If cells A, B, C or D had further sub-cells, the same analysis can be performed on successive levels of the hierarchy, potentially until the leaf-cells are reached. As with situations based on corners, users may wish to merge situations (such as, for example, situations 330 and 350 in this example based on geometric transformation such as translations, mirroring, or rotations. Note that B' (in 310, 330 and 350) in this example is the portion of B that lies within the particular radius of extraction. In these figures, the dark boxes at the center of the situations represent the cells around which the situations have been extracted. This example uses a Manhattan radius of extraction r, resulting in situations that, for example, can be of size 2r+x by 2r+y, where the size of the cells around which the situation has been extracted is x by y.

There is typically a great deal of redundancy in the structure of a layout so many situations are likely repeated large numbers of times on the layout; the canonical set of situations can therefore be a more compressed representation of the universe of layout objects in a full layout. The computational complexity of performing an analysis or transformation on an entire layout can be significantly reduced by performing an equivalent analysis or transformation on the set of situations.

Extracting Situations

Figure 4:
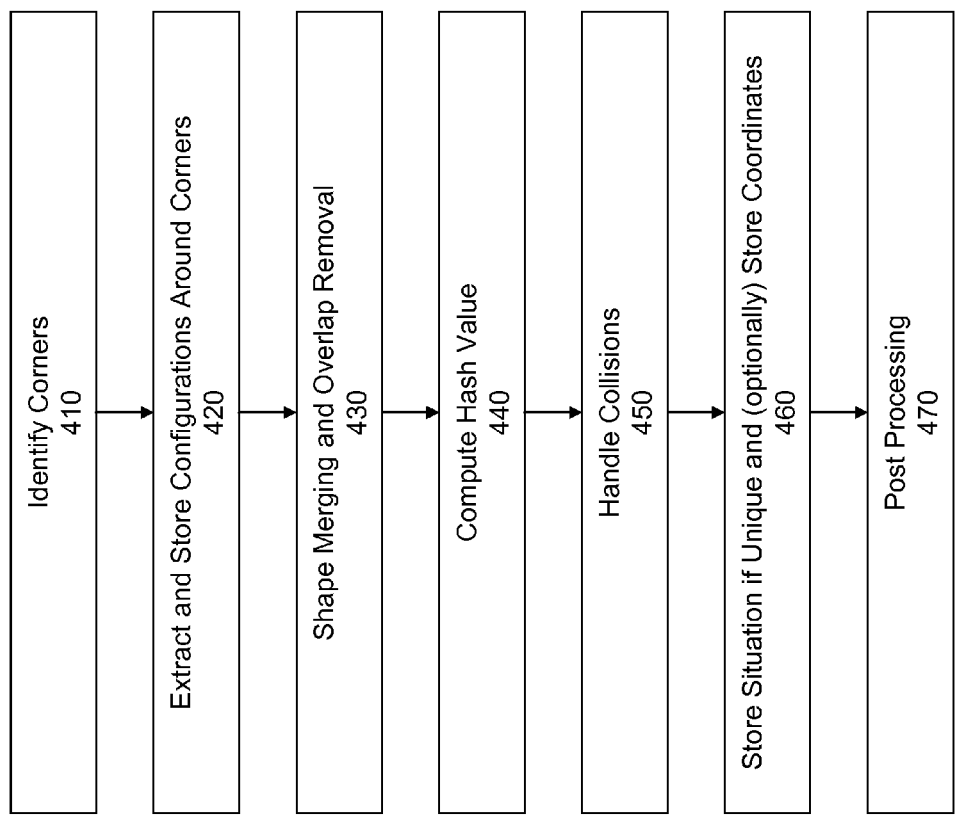
FIG. 4 illustrates a flow diagram for efficiently performing a situation extraction based on corners according to certain embodiments of the present invention.

FIG. 4 illustrates a flow diagram for efficiently performing a situation extraction based on corners according to certain embodiments of the present invention. Referring first to FIG. 4, a generalized view of the process of extracting situations based on corners is described. In the first step 410, the corners of the layout are first identified. The set of true corners can be found through flattening, overlap removal, and merging of polygon shapes. In step 420, configurations of layout around a corner and within a fixed Manhattan distance or "radius" (i.e., the orthogonal distance between two points) can be flattened and these representations of the geometry can be stored. In step 430, overlap removal and shape merging may also be performed so as to make the situation canonical, thus reducing the number of situations that is ultimately generated in step 440, a hash value can be computed for this situation from the component shapes, which provides a semi-unique identifier for the situation. This hash value can be used to index into a hash table. The hash table may be stored in memory, on disk, or a combination of the two. Collisions of hash values can be resolved in step 450 by comparison of a sorted, canonical representation of the geometry. If the hash value is unique, or the situation is different from all other situations with that same hash value, then the situation is stored in the hash table in step 460. The coordinates of this corner can be optionally stored in the step and indexed by the situation's hash value and signature.

Once complete, every entry of the hash table can represent a situation. Additional processing may be performed on the situations in the post-processing step 470, for example to merge situations whose differences are negligible or which can be transformed into other existing situations through user-defined geometric transformations such as translations, mirroring, or rotations.

As described in step 420, situations can be extracted that are within a fixed radius, r, of every corner. The value of r in this implementation is the optical radius, which describes a distance of influence for optical effects. Choosing the optical radius for the value of r can ensure that the center of the situation will simulate with high accuracy. It may be useful to add another constant to the optical radius to provide a border region of geometry, which can yield additional simulation accuracy.

Figure 5:
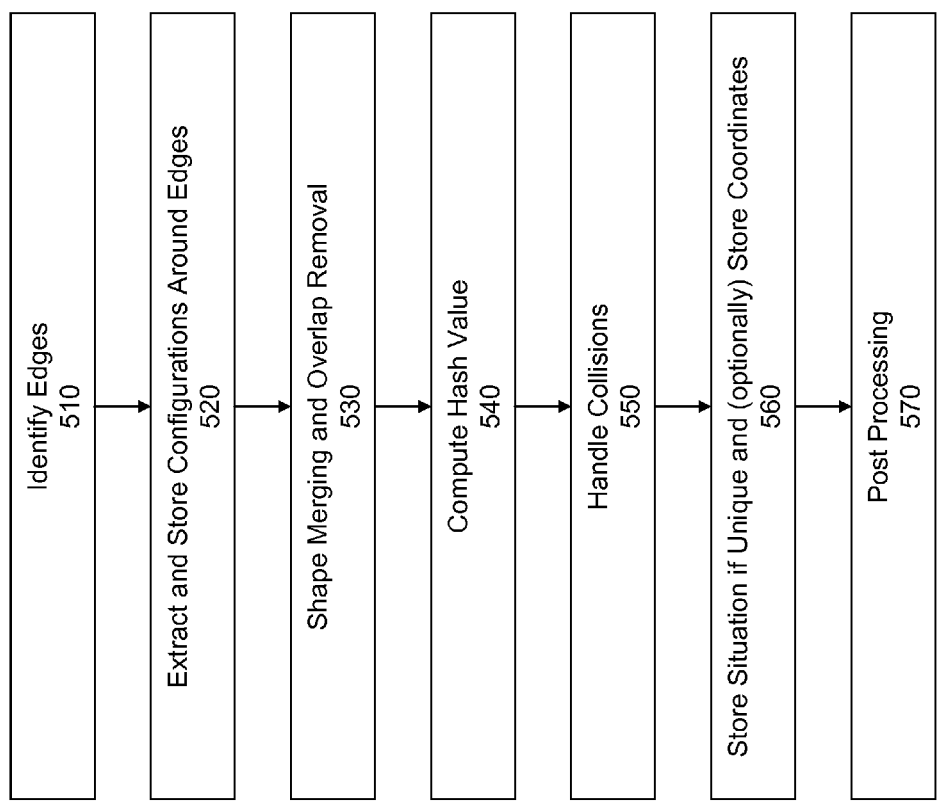
FIG. 5 illustrates a flow diagram for efficiently performing a situation extraction based on edges according to certain embodiments of the present invention.

An expert in the field will understand that while the foregoing discussion was based on situations centered on corners, the same analysis can be performed with situations centered on edges. FIG. 5 illustrates a flow diagram for efficiently performing a situation extraction based on edges according to certain embodiments of the present invention. The steps are identical to those of FIG. 4, except that all steps use edges instead of corners. Such a system would identify every edge in the layout and extract situations that are within a fixed Manhattan distance from the edge in the same manner as the corners discussion above.

Figure 6:
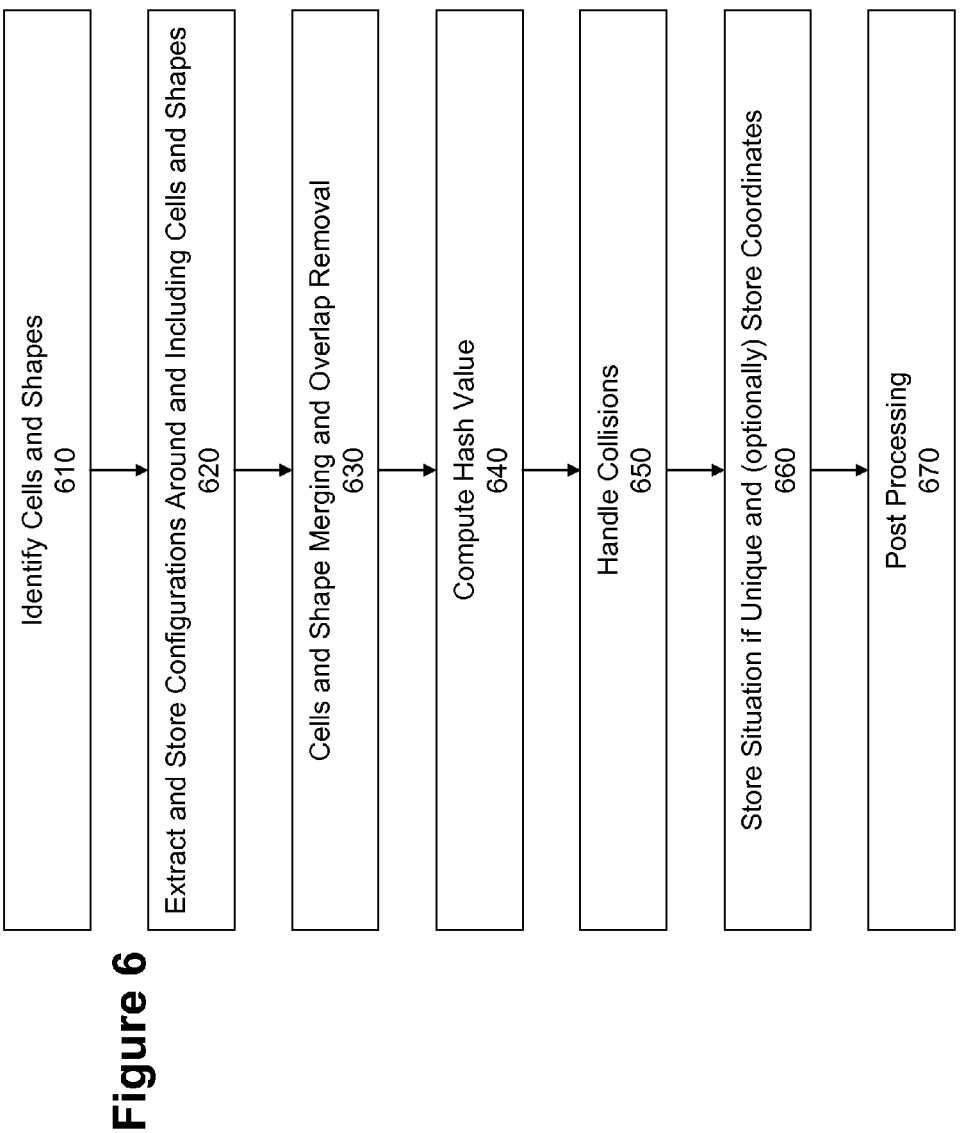
FIG. 6 illustrates a flow diagram for efficiently performing a situation extraction based on cells according to certain embodiments of the present invention.

In an alternative embodiment, extraction can be performed based on the hierarchy. FIG. 6 illustrates a flow diagram for efficiently performing a situation extraction based on cells according to certain embodiments of the present invention. Referring to FIG. 6, a generalized view of the process of extracting situations, based on the hierarchy is described. In the first step 610, every cell and shape instance at one or more levels the hierarchy must first be identified. In step 620, configurations of layout around that cell instance and within a fixed Manhattan distance can be flattened and this combination of cell and geometry is stored. In step 630, overlap removal and shape merging may also be performed so as to make the situation canonical, thus reducing the number of situations that is generated. Similarly, cell instances can be sorted or otherwise reorganized to improve canonicalization.

Alternatively, the flattening can be avoided by including cell instances at some level of hierarchy (at or below the current cell instance) in the situation representation. In step 640, a hash value is computed for this situation from the component shapes and cells, which provides a semi-unique identifier for the situation. This hash value is used to index into a hash table. The hash table may be stored in memory, on disk, or a combination of the two. Collisions of hash values can be resolved in step 650 by comparison of a sorted, canonical representation of the cell and geometry. If the hash value is unique, or the situation is different from all other situations with that same hash value, then the situation is stored in the hash table in step 660. The coordinates of this cell instance or shape may be optionally stored and indexed by the situation's hash value and signature. Once complete, every entry of the hash table represents a situation. Similar to situation extraction based on corners, additional post-processing in step 670 can be applied to merge situations whose differences are negligible or which can be transformed into other existing situations through user-defined geometric transformations such as translations, mirroring, or rotations.

Situations extracted around corners, edges, and cells have been described. Further, it is possible to perform this type of analysis on a combination of corners, edges, and/or cells. Situations extracted around a Manhattan radius have been described. Further, it is possible for the radius to be Manhattan, Euclidian, or other. An expert in the field will now understand that while in the foregoing discussions refer to situations being stored in a hash table, various alternative database structures, such as a tree data structure, can be used to store the situations.

Improving OPC Using Situations

The ability to extract situations from a layout lends itself to a number of powerful applications. In general, applications that involve transformations or analysis of layouts can be greatly sped up by applying the required transformations or performing the required analysis on each of the situations and merging the results. The amount of speed-up is to the first order, proportional to the number of situations that exists in the layout. One such time intensive transformation is optical proximity correction (OPC).

Figure 7:
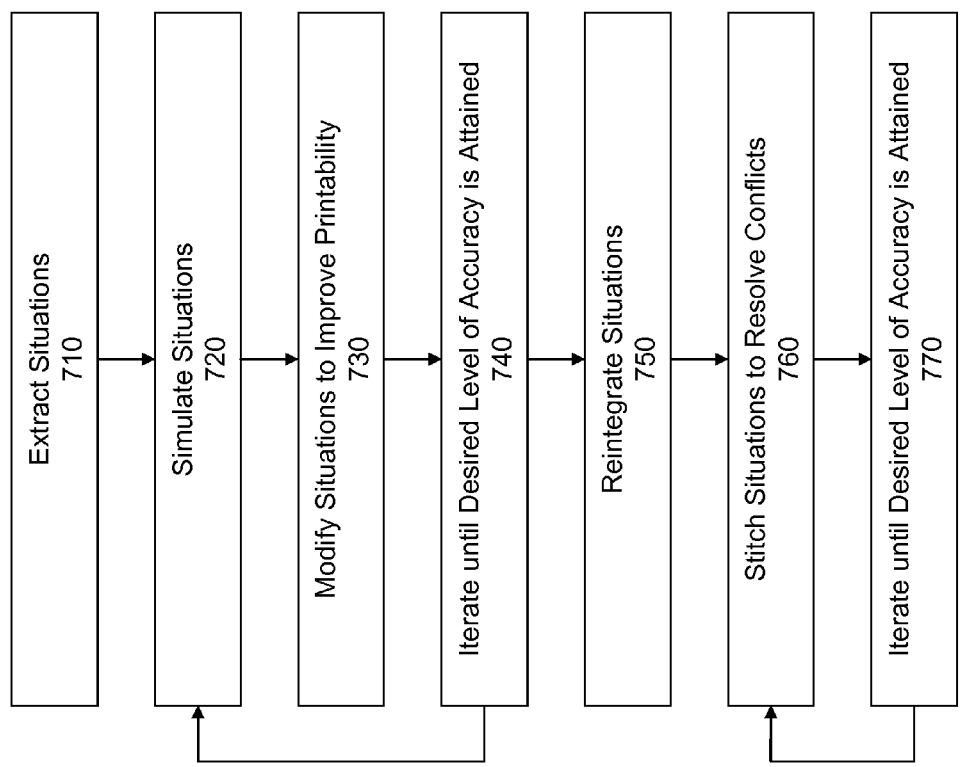
FIG. 7 illustrates a flow diagram for efficiently performing OPC using situations according to certain embodiments of the present invention.

In an alternate implementation, a more efficient approach to performing model-based OPC can be performed using situations. FIG. 7 illustrates a flow diagram for efficiently performing OPC using situations according to certain embodiments of the present invention. In the first step 710, situations are extracted and their coordinates recorded around every corner. In step 720, simulations can be preformed on each situation to examine how the center corner prints. Based at least in part on the simulations, minor adjustments can be applied in step 730 to the features around the center corner to improve printability and further, iterative, simulations can be performed. This iterative process 740 involves minor adjustments of features and further simulations are performed until the center corner prints to within the desired level of accuracy determined by the OPC error tolerances specified by the manufacturing process.

After every situation has been simulated and modified to the desired level of accuracy, the situations are reintegrated back into the full layout by placing them in their original coordinates in step 750. The hierarchy may be flattened by this step. Further, situations can and often do overlap and when the overlapping features do not agree, a further stitching operation in step 760 can be performed. According to certain embodiments of the present invention, the stitching can be performed by averaging two or more conflicting features using a weighted averaging approach. In step 770, further iterations involving minor adjustments of features and simulations can be performed until the desired level of accuracy is achieved, again as determined by the OPC error tolerances. Note that in the iterative steps, the desired level of accuracy may be gated further on a maximum number of iterations which may be determined by available runtime, and so forth. In an alternate implementation, existing OPC tools and techniques can be applied to the situations to perform step 730 and 740.

The above examples used corner-based situations, but this approach can also be accomplished using edge-based situations or a combination of edge- and corner-based situations. In another alternative implementation, extraction of situations based on the hierarchy may also be used. In yet another implementation, the source cell(s) of every situation can be tracked and stored along with its location. This allows some of the hierarchy of the original layout to be preserved. Modifications to cells are propagated to all other cells assuming there are no conflicting dependencies; if a particular source cell is used in multiple situations then a copy of that cell can be created for each incompatible situation so that it can be modified independently.

Improving Yield Analysis Using Situations

Typically, analysis that is performed on a full chip layout can take a prohibitive amount of time due to the complexity of modern layouts. Depending on the amount of redundancy in the layout, extracting situation can be used to speed up this analysis. Instead of performing an analysis on a full chip, analysis can be performed on the subset of the layout that is unique. There are various types of analyses that can be performed to improve yield.

One such analysis is rigorous aerial image simulation, for example, for OPC verification. Full chip simulation is very time intensive. However, by simulating the situations and merging the results, a more efficient full chip simulation can be performed. Simulations can be performed on each situation to examine how the center corner prints. The simulated situations are then tiled back at their original locations. Situations can and often do overlap and when the overlapping features do not agree, a stitching operation may be performed. In one example, the stitching can be performed by the weighted averaging of two or more conflicting features.

Another analysis according to certain embodiments of the invention is the optical characterization of the situations for the purposes of characterizing a lithographic or optical projection printing system. Manufacturers will often use test chips or select a sampling of real or randomly generated designs in order to characterize how well those layouts behave in their lithographic systems. If situations are extracted from those test chips or those selected or generated designs, then rather than performing optical characterizations on entire layouts, this characterization can be performed on the smaller subset of the layout that is captured though situations. In this type of analysis in particular, an edge-based approach to situation extraction may be more useful as the calibration is often performed on edges.

In one example of using situations for characterizing an optical system, situations are extracted that are within a fixed Manhattan distance. Optical characterizations can be performed for each unique edge.

The above description is for characterizing a lithographic system, but the same process can be applied to characterizing an entire system (as for calibrating OPC models). Situations are a means to reduce the space of layout that must be characterized.

Improving Pattern Matching on IC Layout Using Situations

Another analysis, according to certain embodiments of the invention, is to perform a pattern matching operation on an IC layout using situations. One example of this type of analysis, according to certain embodiments of the invention, is to perform a 2D image-based design rule (IBDR) design rule check (DRC) on an IC layout using situations. A 2D IBDR DRC is a type of pattern matching operation that can be run over an entire layout; the basic pattern matching operation can be significantly sped up by searching the set of situations instead of searching the entire layout.

In a certain embodiment, the radius of extraction for this type of operation is chosen so that all search patterns fit within a situation, regardless of orientation.

Figure 8:
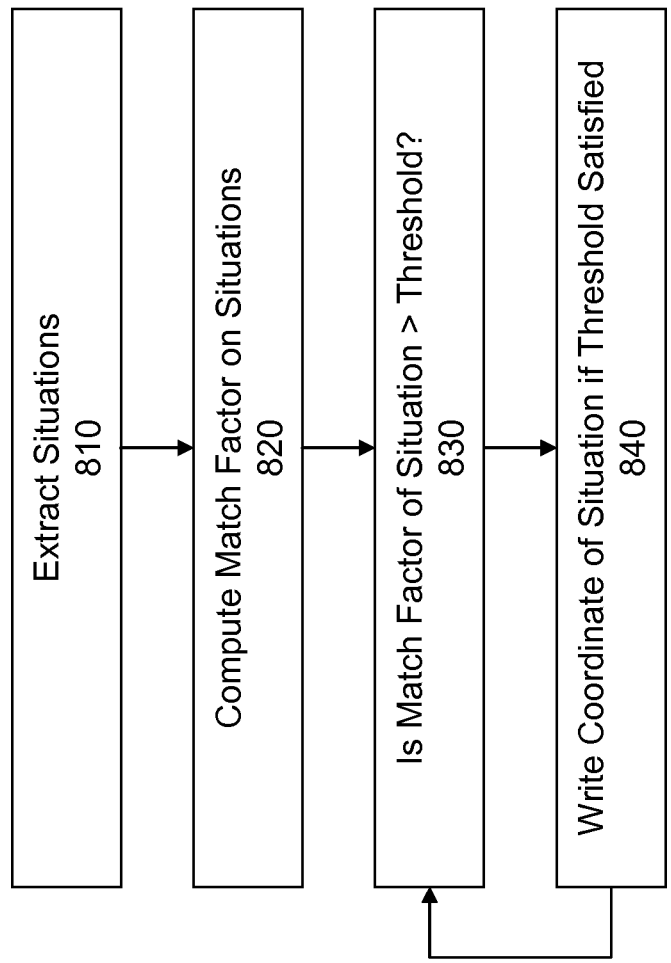
FIG. 8 illustrates a flow diagram for efficiently performing a pattern match using situations according to certain embodiments of the present invention.

FIG. 8 illustrates a flow diagram for efficiently performing a pattern match using situation extraction based on corners according to certain embodiments of the present invention. In the first step 810, the situations are extracted around each corner of the search layout, and the coordinates of each situation is stored. In step 820, for each selected search pattern, a match factor is computed on each situation where the anchor point of the search pattern is aligned to the corner around which each situation was extracted. In step 830, the results of the match factor computations are compared to pre-defined match criteria. If the match factor meets the match criteria, then in step 840, all or part of the coordinate list for that situation is provided as an output to the user. The result can be output in various ways, such as, for example, as a result file or database.

The above embodiment used corner-based situations, but this approach can also be accomplished using edge- or cell-based situations or any combination of the three.

Improving Density Analysis Using Situations

Another analysis, according to certain embodiments of the invention, is to perform density calculations on the situations. This analysis is often complicated by the process of overlap removal; care must be taken to ensure that overlapping shapes are properly accounted for and not multiple-counted.

In one example of applying situations to measure density, situations can be extracted that are within a fixed Manhattan distance (or "radius"), r, of every corner. The location of every situation found can be recorded. The density of every situation can be calculated. The density of a layout is a fraction that is calculated as:

$$\frac{\sum_{Over\ Shapes\ in\ Window} [\text{Area of Shape after Overlap Removal}]}{[\text{Area of Sample Window}]}.$$

Where a density value can be stored for every corner.

One application of density analysis is chemical-mechanical polishing (CMP). The ability of CMP to properly planarize a layer of a chip can be influenced by variations in the density of that particular layer and of the other layers below. The radius of effect of CMP is quite large (on the order of hundreds of microns) and so typically the radius for this type of analysis is significantly larger than for optical effects (on the order of a few microns).

Areas of a chip layout can be color coded based on their density and combined into a full-chip image. This information can be easily visualized if certain colors are associated with certain density values. In one example, the higher the density of the situation, the greater the blue content of the color of that location; similarly, the lower the density, the greater the red content of the color of that location. Users can view an image of the full chip (or portions of the chip) with colors at every situation to look for hotspots where the density is either too high or too low. Other color schemes (or other sensory output) can be used with embodiments of the invention.

Entropy Analysis Using Situations

So far, the discussion of situations has been applied towards reducing the layout space for the purposes of speeding up analysis or for performing transformations of the layout; however, the process of extracting situations can be used to measure the entropy of a layout. The entropy of a layout is a measure of the amount of variability or disorder that exists in the layout. A large number of situations in a layout is indicative of a large amount of variability in the layout. One of the important methods of improving manufacturability is reducing the variability of designs, i.e., by only allowing certain pre-set configurations, a designer can improve the results of the manufacturing process. A lower entropy design is one whose space of possible layout configurations is smaller; this simplifies the problem for manufacturers by reducing the set of possible layout configurations that the process must be optimized for. Comparing the entropy across various layouts also gives a sense of the overall variability across designs and across design styles of various design teams. This analysis can be performed on a per-layer basis or on any subset of the layers of a layout.

According to certain embodiments of the invention, the measure of entropy can be captured via a histogram. The canonical set of situations can be sorted and binned by how often they occur in the layout. For instance, a bin can be created for the total number of situations that occurred only once. The various bins can be plotted relative to the total situation count per bin. FIG. 9 provides an exemplary histogram plot for measuring layout entropy according to certain embodiments of the invention. As shown in FIG. 9, the bins are displayed on a log scale due to the wide spread of occurrence for the various situations and sorted from most to least frequent. This layout has a high degree of entropy; that is, the count of situations that occurred infrequently is very high. Alternatively, the total situation count can displayed as a cumulative percentage relative to the total number of situations, as shown in FIG. 10.

According to certain embodiments of the invention, the measure of entropy can be a single metric. Again the frequency of occurrence of the various situations in a layout can be counted and binned. The user can specify a trip-point, t, that designates a minimal frequency of occurrence (for instance 10). One type of metric is the layout coverage above that trip-point, which measures the percentage of the layout that has been covered by situations with at least t occurrences. Referring to the histogram in FIG. 10, situations that occur 10 or more times in the layout represent less than 10% of the layout. A high percentage is generally desirable, which represents a low layout entropy.

According to certain embodiments of the invention, the entropy can be captured visually as an occurrence density plot that represents the amount of entropy across a full chip. The frequency of occurrence for a particular situation can be represented by a shade of color (for instance, the lower the frequency of occurrence, the more red the shade). Once every situation has been assigned a color, the color can be applied to every location where the situation occurs. In this implementation, areas that are redder in the chip are areas with a great deal of entropy. The designer can then make a decision about whether the high entropy areas of the chip should be redone. Alternatively, the manufacturer has information about what areas of the chip to pay particular attention to during inspection.

As will now be evident to those skilled in the art, there are numerous statistical measures and techniques that can be used with aspects and embodiments of the present invention to aid in the manufacturability of semiconductors. Such measures and techniques are meant to be within the scope of the present invention.

Improving Parasitic Extraction Using Situations

Another application of situations is to perform parasitic extraction. Parasitic extraction refers to the process of analyzing layout configurations in order to more accurately model the resistances, capacitances, and inductances ("parasitics") between the various nodes. These models are used to analyze such aspects as signal timing, power dissipation, and signal crosstalk. More accurate resistance, capacitance, and inductance values leads to more accurate circuit simulations. There is typically a trade-off between model accuracy and processing time. By reducing the size of the set of layout geometries that must be analyzed, the total processing time required to perform parasitic extraction can be reduced.

According to certain embodiments of the invention, in the first step, the situations can be extracted and their coordinates recorded. At this point, the entire layout is composed entirely of a set of situations. There may be areas of overlap between situations and so the situations can be preprocessed to remove overlap. Overlapping geometry is extracted as a cell and instantiated back in the situations from which they came. These cells are marked so that parasitic extraction is only performed once in the areas of overlap. A standard parasitic extraction is performed on every situation. The parasitics that have been extracted are merged together. Standard methods for computing parallel or serial combinations of capacitances, resistances, and inducatances are applied. This process can be applied in three dimensions, thus modeling the interacting parasitics between multiple conductive layers.

In, an alternative implementation, the situations are extracted based on edges or based on the hierarchy. In general, removing the redundancy in the layout through situation extraction reduces the amount of analysis that must be performed.

Compression Approaches Using Situations

Once all the situations based on corners or edges have been extracted from a layout, these situations can be used to compress the layout. This can yield significant compression, especially on flat layouts and layouts that are highly repetitive.

According to certain embodiments of the invention, compressing the layout based on situations includes three steps. In the first step, the situations are extracted based on corners and their coordinates stored. At this point, the entire layout can be composed entirely of a set of situations.

In the second step, the extracted situations are preprocessed to maximize compressibility. In this preprocessing step, the set of situations are minimized through redundancy removal. There may be areas of overlap between situations; if one instance of a situation can be fully described from the overlapping geometry of neighboring situations, then it's coordinate can be safely removed from the set of situations. If all instances of a situation can be removed, then the entire situation can be removed from the set of situations. Further, situations can be decomposed into common subcells (e.g., a shape or set of shapes that is common across multiple situations can be extracted as a new cell that can then be instantiated within the situations from which it came).

In the third step, the actual compression of data occurs through hierarchy insertion and array generation. Hierarchy insertion refers to the process of organizing a situation or group of situations as a cell and instantiating multiple copies of that cell. Array generation refers to the process of arraying multiple instances of a particular situation with an array structure, for example, one composed of rows and columns with equal spacing. Both of these mechanisms reduce the amount of data that must be stored to represent the geometry in the situations.

This method can be coupled with other methods to improve the overall compression. In an alternative implementation, situations are extracted based on edges or cells rather than on corners, or a combination of edges, corners, and cells.

Additional processing may be performed on the situations in the hash table to merge situations whose differences are negligible or situations which can be transformed into other existing situations through a user-defined geometric transformation such as translation, mirroring, or rotation.

Augmenting OPC Using a Fast Pattern Matching

In a previous section, unique situations were applied to speed up the pattern matching operation as applied to IC layouts. The existence of a fast pattern matcher is an enabler for a number of powerful applications which will be described below.

FIG. 11 illustrates a flow diagram for efficiently resolving pattern errors through the use of pattern matching according to certain embodiments of the present invention. As shown in FIG. 11, a pre-OPC layout 1100 can be streamed to a model-based OPC tool 1105, which can perform optical/process proximity correction on the layout. At step 1110, the user can identify areas of the layout that fail an Edge-Placement-Error test, either after OPC or from another similar tool such as an optical/process rule checker (ORC/PRC) tool. However, as will be evident to those skilled in the art, the identifying step 1110 can be automated in total or in part.

Pattern areas of interest can then clipped and sent to the pattern matching tool 1115. The pattern matcher, according to certain embodiments of the present invention can compare all of the clips to one another and identify a set of unique patterns 1120. As described earlier, the performance of this step can be improved through the use of unique situations. The clips can then be sorted by likeness and the location from where each clip originated in the original layout can be saved 1125. The user can then determine the best correction for each sorted and saved clip 1130. The correction may be determined either manually or by means of a computer-aided OPC algorithm. At step 1135, the new, corrected clips can then be substituted for the originally identified failed clips, using the coordinates of the stored locations being used to replace the original clips. The new layout can then be output as a new post-OPC layout 1140.

FIG. 12 illustrates a flow diagram for quickly applying pattern corrections to a layout according to certain embodiments of the present invention. As shown in FIG. 12, the process can begin by streaming a post-OPC layout 1200 to a manufacturing process 1205, which can result in a failed test chip. Tests performed in a lab or fab, for example an SEM image, can identify a failed portion of a manufactured pattern 1210.

A pattern matcher can locate the portions of the layout that contain the failed pattern(s) 1215, which enables the user to view and revise the post-OPC layout. The user can then determine whether the problem (i.e., the one or more failed patterns) is due to the failure of the OPC algorithm 1220. If the problem is due to the failure of the OPC algorithm, the process advances to step 1230 where the user can determine the best fix, either manually or with computer aided algorithm(s). Then, both the good and bad clips can be saved to an image-based design rules database 1235. In addition, the corrected clips can be substituted for the clips containing the bad patterns in the current layout 1240, which can yield a new layout as the output 1245. However, if the problem is not an OPC failure (as determined in 1220), the user can then determine whether the problem can be fixed with a search & replace operation 125. If there are known corrections for the problem, then the correct clips can be substituted for the clips containing the bad patterns 1240, which can yield a new layout as the output 1245. If it is not, then the process branches to step 1250, and concludes because alternate means are needed to fix the bad pattern.

FIG. 13 illustrates a flow diagram for implementing image-based pattern matching according to certain embodiments of the present invention. As shown in FIG. 13, fast pattern matching can be used for multi-dimensional rule-based optical proximity correction. A two-dimensional pattern match can be used for purposes of this example, although more complex pattern matching can be readily implemented in light of the present disclosure. This example begins with the original layout reflecting the designer's intent 1300. Separately, the user can determine the best post-OPC corrections to pre-OPC sections, or clips, of the layout, where the clips to be corrected have been determined previously, for example by model-based or other OPC. Then an image-based OPC library, or database, can be constructed 1310 which can include multiple associated pairs of pre- and post-OPC layout clips. Put more simply, the database can include the clips containing the bad pattern, so that they can be identified, and also contains revised clips that include resolution of the defect, as shown at 1310A and 1310B in FIG. 13.

A pattern matching algorithm 1315 can be used to find layout locations that include bad patterns, similar to pre-OPC clips in the library or database. The identified areas can then be automatically (or manually, as appropriate) replaced by the post-OPC clips from the database 1320, after which the new layout can be saved 1325. The new layout can then be passed to the mask-making process for manufacturing, or run through further tests, for example, using, another rule- or model-based OPC tool.

FIG. 14 illustrates a flow diagram for determining a figure of merit referred to as a match factor for evaluating how well a particular layout matches a designer's intent according to certain embodiments of the present invention. As shown in FIG. 14, the critical feature match factor can be computed to quantify how well optical proximity correction (OPC), process proximity correction (PPC), resolution enhancement techniques (RET), etc. perform their intended jobs. The process begins with a pre-OPC layout 1400 stored in a standard format such as GDSII or OASIS. After one or more OPC processes are run 1401, a post-OPC layout is generated 1405. The resulting design can be fabricated in the manufacturing process 1410, and SEM images can be taken 1415 of one or more user-defined critical feature(s) and surrounding area(s).

The pre-OPC layout 1400 can also be used by the chip designer to identify a pattern of interest 1420, which might best reflect the designer's intent. In addition, the user can identify a critical feature 1425 with a selected layout clip, and also can provide a configuration file 1430. The configuration file might contain information such as file locations, desired format for the output, criteria for pattern matching such as customized thresholding, weighting of the patterns, and the like.

The pattern of interest and critical feature can be used, in combination with the configuration file, as a basis for comparison with the SEM image through the use of a two-iteration technique 1435. Such a technique 1435 is described in detail below. However a brief description is provided here for clarity. The pattern of interest can be used to develop two patterns, say patterns A and B, and the SEM image can be used to develop two images, say images C and D (as described below). The thresholding of pattern A and SEM image C can allow for precise alignment for an overlay. The thresholding of pattern B and SEM image D can then allow for isolation of a user-defined critical feature, where patterns A and B have precisely the same coordinates, as do images C and D, since in both cases the two patterns/images were taken from the same source. By comparing the overlay of the critical feature between the pattern and the image, a Critical Feature Match Factor can be achieved 1440, which may be used as a figure of merit 1445 for the accuracy with which a manufactured chip has implemented a designer's intent after going through various design checks and changes including OPC, PPC and RET.

Although the present invention has been particularly described with reference to embodiments thereof, it should be readily apparent to those of ordinary skill in the art that various changes, modifications, substitutes and deletions are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of inventive elements illustrated and described in the above figures. It is intended that the scope of the appended claims include such changes and modifications.

What is claimed is:

1. A method for evaluating a layout, comprising:
using at least one processor to perform a process, the process comprising:
simulating a plurality of situations, which are extracted from the layout, for the layout, wherein
at least one situation of the plurality of situations includes an arrangement of one or more shapes or cell instances that represent one or more circuit features to be manufactured from the layout;
tiling the plurality of situations, which have been simulated, back into locations in the layout based at least in part upon a result of simulating the plurality of situations, and
determining data indicative of an amount of variability or disorder that exists in the layout by using at least the some of the plurality of situations.

2. The method according to claim 1, wherein:
the simulating includes examining how center corners print.

3. The method according to claim 1, further comprising:
performing a stitching operation for two situations that have overlapping features that do not agree.

4. The method according to claim 1, further comprising:
performing a stitching operation for two situations that have overlapping features that do not agree, wherein the stitching operation is performed based at least in part on weighted averaging of two or more conflicting features.

5. The method according to claim 1, further comprising:
identifying the situations.

6. The method according to claim 1, further comprising:
identifying the situations including identifying features;
extracting and storing configurations around the features; and
merging configurations.

7. The method according to claim 1, the process further comprising:
determining one or more aerial images of the plurality of situations; and
forming a larger aerial image based at least in part upon tiled situations resulting from tiling the plurality of situations.

8. The method according to claim 7, the process further comprising:
stitching at least two of the tiled situations resulting from tiling the plurality of situations to resolve one or more conflicts.

9. The method according to claim 1, the process further comprising:
simulating one or more sets of situations, which are extracted from the layout, for the layout;
tiling the one or more sets of situations, which have been simulated, into first locations in the layout based at least in part upon a result of simulating the one or more sets of situations; and
merging results of tiling the one or more sets of situations and of tiling the plurality of situations to determine full-chip simulation results without performing full-chip simulations.

10. The method according to claim 1, the process further comprising:
characterizing a lithographic or optical projection printing system by using at least some of the plurality of situations without performing optical characterizations on the layout in its entirety.

11. The method according to claim 1, the process further comprising:
determining entropy of the layout by using at least some of the plurality of situations, wherein the entropy of the layout includes information that indicates the amount of variability or disorder that exists in the layout.

12. A system for evaluating a layout, comprising:
a computing system having at least one processor;
a non-transitory computer readable medium that is operatively linked with the at least one processor via at least a bus architecture and stores thereupon program code, a compiled version of which, when executed by the at least one processor, causes the processor to execute one or more sequences of instructions to perform one or more acts on the layout;

the computing system having the at least one processor is to execute a first set of instructions to invoke a simulation module to simulate a plurality of situations, which are extracted from the layout, for the layout, wherein at least one situation of the plurality of situations includes an arrangement of one or more shapes or cell instances that represent one or more circuit features to be manufactured from the layout;

the computing system having the at least one processor is further to invoke a situation management module to tile the plurality of situations, which have been simulated, back into locations in the layout based at least in part upon a result of simulating the plurality of situations; and the computing system having the at least one processor is further to invoke a characterization module to determine data indicative of an amount of variability or disorder that exists in the layout by using at least the some of the plurality of situations.

13. The system of claim 12, wherein the computing system is further to:

execute at least some of the one or more sequences of instructions to invoke the situation management module to perform a stitching operation for two situations that have overlapping features that do not agree.

14. The system of claim 12, wherein the computing system is further to:

execute at least some of the one or more sequences of instructions to invoke the situation management module to use at least weighted averaging of two or more conflicting features to perform a stitching operation for two situations that have overlapping features that do not agree.

15. The system of claim 12, wherein the computing system is further to:

execute at least some of the one or more sequences of instructions to identify the situations including identifying features;

execute at least some of the one or more sequences of instructions to extract and store configurations around the features; and execute at least some of the one or more sequences of instructions to merge configurations.

16. An article of manufacture comprising a non-transitory computer accessible storage medium having stored thereupon a sequence of instructions which, when executed by at least one processor, causes the at least one processor to perform a method for evaluating a layout, comprising:

a program code, a compiled version of which, when executed by at least one processor, causes the at least one processor to execute a sequence of instructions to perform one or more processes on the layout, the program code comprising:

a first program code, a compiled version of which, when executed by the at least one processor, causes the at least one processor to execute the sequence of instructions to perform an act of simulating a plurality of situations, which are extracted from the layout, for the layout, wherein at least one situation of the plurality of situations includes an arrangement of one or more shapes or cell instances that represent one or more circuit features to be manufactured from the layout; and a second program code, a compiled version of which, when executed by the at least one processor, causes the at least one processor to execute the sequence of instructions to perform an act of tiling the situations, which have been simulated, back into locations in the layout based at least in part upon a result of simulating the plurality of situations.

17. The article of manufacture of claim 16, the program code further comprising:

a third program code, a compiled version of which, when executed by the at least one processor, causes the at least one processor to execute the sequence of instructions to perform an act of performing a stitching operation for two situations that have overlapping features that do not agree.

18. The article of manufacture of claim 16, the program code further comprising:

a third program code, a compiled version of which, when executed by the at least one processor, causes the at least one processor to execute the sequence of instructions to perform an act of performing a stitching operation for two situations that have overlapping features that do not agree, the stitching operation is performed based at least in part on weighted averaging of two or more conflicting features.

19. The article of manufacture of claim 16, the program code further comprising:

a third program code, a compiled version of which, when executed by the at least one processor, causes the at least one processor to execute the sequence of instructions to perform an act of identify the situations including identifying features;

a fourth program code, a compiled version of which, when executed by the at least one processor, causes the at least one processor to execute the sequence of instructions to perform an act of extracting and storing configurations around the features; and a fifth program code, a compiled version of which, when executed by the at least one processor, causes the at least one processor to execute the sequence of instructions to perform an act of merging configurations.

* * * * *